UNITED STATES PATENT OFFICE.

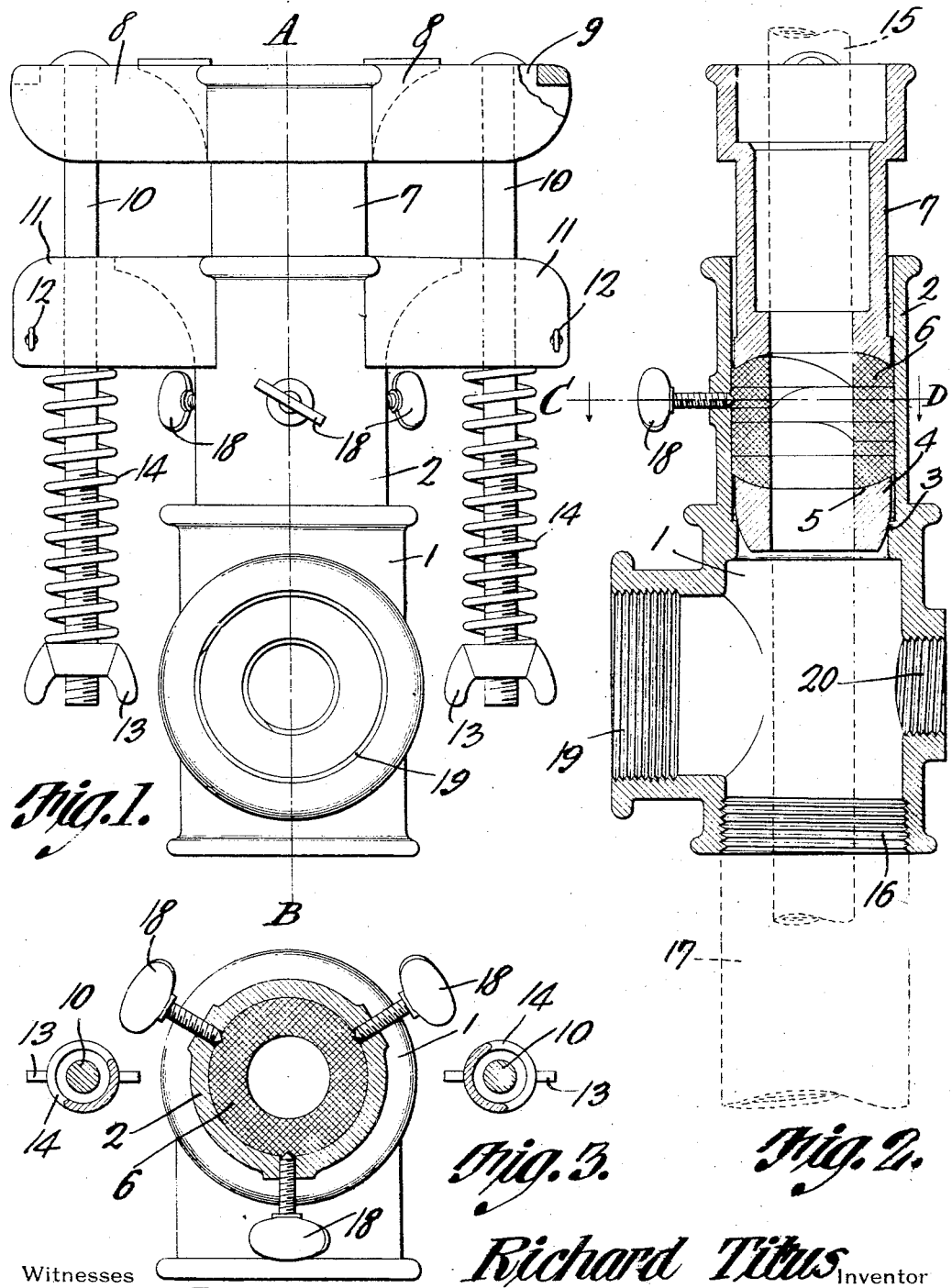

RICHARD TITUS, OF BOWLING GREEN, OHIO.

STUFFING-BOX FOR OIL-WELLS.

1,168,637.

Specification of Letters Patent. Patented Jan. 18, 1916.

Application filed May 18, 1914. Serial No. 839,378.

*To all whom it may concern:*

Be it known that I, RICHARD TITUS, a citizen of the United States, residing at Bowling Green, in the county of Wood and State of Ohio, have invented a new and useful Stuffing-Box for Oil-Wells, of which the following is a specification.

This invention relates to stuffing boxes for oil wells, one of its objects being to provide an improved bushing which will adjust itself to the polish rod working therein without causing the bushing to wear flat and thus leak and at the same time injure the polish rod by wearing it to an undesirable extent.

A further object is to provide a stuffing box having means whereby the follower can be removed and the box repacked without necessitating shutting down the pump.

Another object is to provide a packing box having means whereby a release cock can be applied thereto so that, should the line pipe become frozen, as when it is customary to shut down over night, there is no danger of bursting the line pipe as often happens where the pump is started before it has been determined that the line pipe is frozen. Furthermore, by the use of a release cock, the stuffing box can be drained in cold weather to prevent freezing.

A further object is to provide improved means for assembling the parts of the stuffing box, the follower being so mounted as to permit any necessary lateral movement of the polish rod without producing undue wear upon the rod or upon the packing arranged under the follower.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is an elevation of the stuffing box embodying the present improvements. Fig. 2 is a section on line A—B Fig. 1. Fig. 3 is a section on line C—D Fig. 2.

Referring to the figures by characters of reference, 1 designates the casing of the stuffing box, said casing being formed with a long upwardly extending tubular arm 2 provided, adjacent its lower end, with an interior annular shoulder 3 constituting a bearing for a metal ring or bushing 4, the lower end portion of which is rounded or tapered so as to fit snugly upon the shoulder 3 and permit the said bushing to rock in any direction. The upper end of the bushing 4 is concaved, as shown at 5 so as to support a series of superposed split washers 6 of felt, rubber or like flexible material, the uppermost one of which is adapted to be engaged by the concaved lower end of a tubular follower 7 slidably and loosely mounted in the arm 2. The upper end of this tubular follower has oppositely extending arms 8 formed with slots 9 adjacent their outer ends and fitted loosely in these slots are the upper ends of ordinary carriage bolts 10 extending downwardly loosely through the slotted ends of arms 11 formed with and extending radially from the tubular arm 2. Retaining pins 12 are extended transversely within the slotted arms 11 to prevent the carriage bolts 10 from swinging outwardly from the said slotted arms 11.

Wing nuts 13 or the like may be mounted upon the lower ends of the bolts 10 and are adapted to support coiled springs 14 which bear upwardly against the arms 11. By means of these nuts the springs 14 can be placed under any desired degree of compression so as to cause the bolts 10 to pull downwardly on arms 8 and cause the follower 7 to press upon the soft washers 6, thus to cause the said washers to be deflected or contracted inwardly between the concave end of the follower 7 and the concave seat 5 so as thus to fit tightly about the polish rod shown at 15 and which is adapted to reciprocate within the stuffing box. The lower end of the casing 1 is interiorly screw threaded, as shown at 16, so as to engage the upper end of the well tube or casing 17. By providing a bushing 4 such as described which is mounted in the manner set forth, and by utilizing a follower 7 which is loosely mounted within the arm 2 and capable of tilting to a slight extent, it will be seen that the follower 7 as well as the bushing 4 are free to adapt themselves to any lateral movements of the polish rod and will not wear unevenly, as heretofore, but will wear smoothly and prevent leakage.

Extending through the wall of the arm 2 at desired intervals are retaining screws 18 the inner ends of which are pointed. In the structure shown, three of these screws are provided although it is to be understood that any desired number of them can be used. These screws constitute an important improvement in that by the use thereof it becomes possible to repack the stuffing box without stopping the operation of the polish rod. To do this, the screws 18 are forced inwardly until their ends come close to the polish rod. The screws will thus assume positions above certain of the washers 6. The nuts 13 are then loosened, pins 12 withdrawn, and bolts 10 swung outwardly from engagement with the arms 11. Thus the follower 7 can be lifted out of the arm 2, the screws 18 serving to hold the lower washer 6 and the bushing 4 against displacement. Additional washers can then be placed in the arm 2, the follower 7 replaced, the rods 10 inserted into the slotted arms 11 and the nuts 13 tightened, after which the screws 18 can be withdrawn from engagement with the washer 6. Thus, the springs 14, being brought into play, will crowd the follower 7 downwardly against the washers which have been inserted in the arm 2, thereby pressing all of the washers tightly together. This has been found to be an important feature in that the expense resulting from the delay heretofore required by the shutting down of the pump during the repacking of the box is avoided.

It is a well known fact that the pipe lines extending from the pump casing often become frozen in the winter time where it is the practice to shut down the pump over night. The opening to which the pipe line is connected has been indicated at 19. In order to prevent the line pipes from bursting, another opening 20 is provided in the casing 1, preferably directly opposite the opening 19, this opening 20 being adapted to receive a release cock, not shown. Consequently, before the pump is started after a cold night, this release cock can be opened and, when the polish rod is set in motion, the oil will be discharged through the release cock should the line pipe be frozen. Thus danger of bursting the line pipe is eliminated. If desired, by means of the release cock, the stuffing box can be drained at night after the pump has been stopped.

By utilizing the slotted arms 8, ordinary carriage bolts can be employed and it does not become necessary to use bolts of special form such as have heretofore been required. Consequently should one of the bolts become broken, a new one can be readily procured and substituted therefor.

What is claimed is:—

In a stuffing box for oil wells, the combination with a casing having an upstanding tubular guide arm, of a bushing mounted to rock within the lower portion of the arm and having a concaved end, a tubular follower adjustably mounted within the arm and having a concaved inner end, said bushing and follower having openings therein for the reception of a polish rod, flexible packing washers filling the space between the bushing and follower and fitting snugly within the tubular arm, radially disposed screws extending through the wall of the arm and disposed in the same plane, said screws being adjustable toward each other to separate certain of the washers and constitute backings for those washers between the screws and the bushing, and yieldable means for exerting a constant pressure upon the follower.

In testimony that I claim the foregoing as my own, I have hereto affixed my signature in the presence of two witnesses.

RICHARD TITUS.

Witnesses:
JAMES A. WALKER,
RAY D. AVERY.